US009047677B2

(12) United States Patent
Sedky et al.

(10) Patent No.: US 9,047,677 B2
(45) Date of Patent: Jun. 2, 2015

(54) IMAGE PROCESSING

(75) Inventors: Mohamed Hamed Ismail Sedky, Beaconside (GB); Claude Chilufya Chibelushi, Beaconside (GB); Mansour Moniri, Beaconside (GB)

(73) Assignee: Staffordshire University Enterprise and Commercial Development, Stafford (GB)

( * ) Notice: Subject to any disclaimer, the term of this patent is extended or adjusted under 35 U.S.C. 154(b) by 324 days.

(21) Appl. No.: 13/140,378

(22) PCT Filed: Dec. 7, 2009

(86) PCT No.: PCT/GB2009/002829
§ 371 (c)(1),
(2), (4) Date: Sep. 21, 2011

(87) PCT Pub. No.: WO2010/070265
PCT Pub. Date: Jun. 24, 2010

(65) Prior Publication Data
US 2012/0008858 A1    Jan. 12, 2012

(30) Foreign Application Priority Data
Dec. 16, 2008   (GB) ................................. 0822953.6

(51) Int. Cl.
G06K 9/46    (2006.01)
G06T 7/20    (2006.01)
G06T 7/40    (2006.01)

(52) U.S. Cl.
CPC ............... *G06T 7/2053* (2013.01); *G06T 7/408* (2013.01); *G06T 2207/10016* (2013.01); *G06T 2207/20144* (2013.01)

(58) Field of Classification Search
None
See application file for complete search history.

(56) References Cited

U.S. PATENT DOCUMENTS 4,992,963 A *  2/1991 Funt et al. ..................... 382/162
5,291,269 A    3/1994 Ledger
(Continued)

FOREIGN PATENT DOCUMENTS

EP    2 036 424 A2    3/2009
JP    60500270 T    2/1985
(Continued)

OTHER PUBLICATIONS

Theo Gevers; Arnold W.M. Smeulders; Harro Stokman, "Photometric invariant region detection", 1998, In Proc. of British Machine Vision Conference (BMVC), pp. 659-669.*
(Continued)

*Primary Examiner* — Sumati Lefkowitz
*Assistant Examiner* — Carol Wang
(74) *Attorney, Agent, or Firm* — Patterson Thuente Pedersen, P.A.

(57) ABSTRACT

An image segmentation method has a training phase and a segmentation phase. In the training phase, a frame of pixellated data from a camera is processed using information on camera characteristics to render it camera independent. The camera independent data are processed using a chosen value of illuminant spectral characteristics to derive reflectivity data of the items in the image. Pixels of high reflectivity are established. Then, using data from the high reflectivity pixels, the actual illuminant spectral characteristics are established. The illuminant data are then processed to determine information on the illumination of the scene represented by the frame of pixellated data to derive reflectivity data of the scene. The segmentation phase comprises operating on a subsequent frame of pixellated data to render it camera independent and using the determined illumination information to process the camera independent data to determine reflectivity data of the scene to derive a foreground mask.

26 Claims, 7 Drawing Sheets

(56) References Cited

U.S. PATENT DOCUMENTS

| | | | |
|---|---|---|---|
| 5,987,161 | A | 11/1999 | Doane et al. |
| 6,668,078 | B1 | 12/2003 | Bolle et al. |
| 6,763,136 | B1 | 7/2004 | Sweet |
| 2002/0159634 | A1* | 10/2002 | Lipton et al. ............ 382/173 |
| 2004/0017379 | A1* | 1/2004 | Ajito et al. ............ 345/600 |
| 2004/0169869 | A1 | 9/2004 | Shin et al. |
| 2005/0018223 | A1* | 1/2005 | Debevec et al. ............ 358/1.9 |

FOREIGN PATENT DOCUMENTS

| | | | | |
|---|---|---|---|---|
| JP | 2004184391 | | 7/2004 | |
| WO | WO 2008093988 | A1 * | 8/2008 | ............ H04N 9/04 |
| WO | WO 2009026966 | A1 * | 3/2009 | ............ G06T 5/40 |

OTHER PUBLICATIONS

Mikic, Ivana, Pamela C. Cosman, Greg T. Kogut, and Mohan M. Trivedi. "Moving shadow and object detection in traffic scenes." In Pattern Recognition, 2000. Proceedings. 15th International Conference on, vol. 1, pp. 321-324. (Sep. 3, 2000).*

Tan, Robby T., and Katsushi Ikeuchi. "Reflection components decomposition of textured surfaces using linear basis functions." In Computer Vision and Pattern Recognition, 2005. CVPR 2005. IEEE Computer Society Conference on, vol. 1, pp. 125-131. (Jun. 20, 2005).*

Lou, Jianguang, et al., "An Illumination Invariant Change Detection Algorithm," *The 5th Asian Conference on Computer Vision*, Jan. 2002, Melbourne, Australia (6 pgs.).

Gershon, Ron, et al., "The Computation of Color Constant Descriptors in Chromatic Images," *Color Research & Application*, vol. 14, No. 6, Dec. 1989 (pp. 325-334).

Hordley, Steven D., "Scene Illuminant Estimation: Past, Present, and Future," *Color Research & Application*, vol. 31, No. 4, Aug. 2006 (pp. 303-314).

McCamy, C.S., "Correlated Color Temperature as an Explicit Function of Chromaticity Coordinates," *Color Research & Application*, vol. 17, No. 2, Apr. 1992 (pp. 142-144).

Lam, William Wai Leung, et al., "Highly accurate texture-based vehicle segmentation method," *Opt. Eng.*, vol. 43, No. 3, Mar. 2004 (pp. 591-603).

Parkkinen, J.P.S., "Characteristic spectra of Munsell colors," *J. Opt. Soc. Am. A*, vol. 6, No. 2, Feb. 1989 (pp. 318-322).

* cited by examiner

IMAGE PROCESSING

RELATED APPLICATIONS

The present application is a National Phase entry of PCT Application No. PCT/GB2009/002829, filed Dec. 7, 2009, which claims priority from Great Britain Application Number 0822953.6, filed Dec. 16, 2008, the disclosures of which are hereby incorporated by reference herein in their entirety.

FIELD OF THE INVENTION

The present invention relates to the field of image processing.

Embodiments relate to methods and devices for object segmentation in images. One example application is to video surveillance systems.

BACKGROUND OF THE INVENTION

Prior art documents exist in which camera output is treated as a direct measure of reflectance; this can be true where chromaticity and intensity of illumination are invariant, and where a single camera is used. An example is U.S. Pat. No. 6,763,136. In fact, as known to those skilled in the art, camera output is a combination of illumination (which itself depends on illuminant), on camera sensitivity and on reflectivity.

An aim is to determine reflectance or reflectivity of surfaces represented in a scene which is subject to variations, and not constrained as above.

FIG. 6 illustrates a block diagram of an automated video surveillance system 1 which includes serially connected stages. These stages include a video acquisition stage 10, a background-foreground object segmentation stage 11, a tag detection stage 12, a skin detection stage 13, an object localization stage 14, an object tracking stage 15, and a movement classification stage 16.

The video acquisition stage, and frame grabber 10 acquire an image of a scene. The foreground object segmentation stage 11 segment foreground objects from the surrounding information, by comparison with a background model 21, and this can be cropped out leaving a new image with a foreground object or predefined tagged object. The tag detection stage 12 and skin detection stage 13 help identify an object e.g. tag or head within the image by comparison with a tag model 22 and a skin model 23.

Once these features have been identified, the object localization stage 14 determines the 2D location of foreground objects, heads and tags within the camera field of view. Then detected object locations may be tracked using an object tracking stage 15. Where the requirement of a video surveillance system is to detect movement, a movement classification module 16 is required to analyze the trajectory of each object, and compare it with preset trajectories or behaviors.

Background-Foreground segmentation stage 11, tag detection stage 12 and skin detection stage 13 are different types of object segmentation algorithms.

The goal of object segmentation algorithms is to ultimately group pixels into regions which represent objects. The output of these algorithms may be a binary mask, or a set of connected pixels which correspond to a certain group.

The object segmentation problem is divided into three main problems: selection of image representation, statistical modelling, and threshold selection.

1. Selection of Image Representation

The main question is what is the optimal image representation for object classification?

Developers have used different color spaces, e.g. RGB, normalized RGB, HSV, YCbCr, CIELAB and RGB color ratio. However normalized RGB and HSV are the most common color spaces used. It has been shown that these color spaces are more tolerant of minor variations in the illuminant.

2. Statistical Modelling

Object segmentation systems typically build a statistical model in order to define a decision rule which discriminates between the pixels of the target object and those of other objects. Statistical models used in existing object segmentation approaches are divided into parametric and non-parametric approaches. Parametric approaches use a specific functional form with adjustable parameters chosen to fit the model to the data set; examples are: Gaussian models such as mixtures of Gaussians, and elliptic boundary model. Examples of non-parametric approaches are: normalized lookup table, Bayes classifier, and self organizing map.

3. Threshold Selection

A threshold in the decision rule determines if a pixel in the test image corresponds to a target object or not. Due to camera noise and illumination variations, pixels are liable to be classified as a target object even if they do not belong to it: a high value of the threshold allows maintaining a low number of false detections. On the other hand, objects presenting a low contrast with respect to the target risk will be eliminated if the threshold is too high.

Referring to FIG. 7, the first step of a typical object segmentation algorithm 600 is video acquisition 601 followed by image conversion 604. Data of a current frame 602 is applied to a foreground segmentation step 606 that receives background model data 603 as a second input. The foreground segmentation step 606 has an output, a foreground pixel map 607 of the current frame that is fed to a noise removal step 608. The noise removal step 608 has an output 609 that is an enhanced foreground pixel map, and this is input to a connected component analysis stage 610 whose output is a set of labelled foreground regions 611. The set of labelled foreground regions 611 is fed to a further post-processing stage 612, having an output 613 that is fed to an object and feature extraction stage 614 and to an update feedback path to a background modelling stage 620, that is fed with data 605 from the image conversion stage 604 during an initialization phase.

The algorithm starts by acquiring a number (N), of training images and converting the acquired training images into a convenient image representation; e.g. a specific color space such as normalized RGB. As noted above normalized RGB can be used to reduce the effect of illumination change. The second step is to build the background model 607 for the target object. A threshold selection module has the role of choosing the appropriate thresholds (r) to use in later comparison between a current frame and the background model.

Test images are then acquired and analyzed to determine if a pixel in the test image corresponds to the background model 607 or not. The post-processing stage 608 filters out noises before making the final decision. Finally, to update the background model, model maintenance is performed.

The goal of the foreground object segmentation algorithm is to determine which pixels belong to the foreground, even before classifying the remaining changed pixels into different foreground classes.

Object segmentation is a well known desideratum. Conventional techniques may be computationally intensive, and not be capable of implementation in real-time.

A device for and a method of image processing that can enable segmentation to be carried out in a less computationally-intensive fashion would be desirable. Such a device could use an assessment of reflectivity to assist in this aim.

In order to extract the reflectivity of different parts of an image, an illumination estimation algorithm is required. Several approaches have been used to build illumination estimation algorithms, in contexts other than that of image analysis.

Referring to FIG. 8, the output of a camera depends on three factors:

1. Illuminant (light source) (E) 801
2. Spectral response characteristics (Q) of camera (sensors) 840
3. Reflectivity (S) of the object 830

For an RGB camera, the R G and B outputs are related to the illuminant, the camera response and the reflectivity by Equation (1)

$$R = w_d \int E(\lambda) \cdot S(\lambda) \cdot Q_R(\lambda) d\lambda + \tilde{w}_s \int E(\lambda) \cdot Q_R(\lambda) d\lambda$$

$$G = w_d \int E(\lambda) \cdot S(\lambda) \cdot Q_G(\lambda) d\lambda + \tilde{w}_s \int E(\lambda) \cdot Q_G(\lambda) d\lambda$$

$$B = w_d \int E(\lambda) \cdot S(\lambda) \cdot Q_B(\lambda) d\lambda + \tilde{w}_s \int E(\lambda) \cdot Q_B(\lambda) d\lambda \qquad \text{Eq. 1}$$

where $\lambda$ is the wavelength (the visible range is approximately from 400 nm to 700 nm), $E(\lambda)$ is the illuminant spectral intensity of radiation, $S(\lambda)$ is the spectral reflectivity of the object, $Q_R(\lambda)$ is the red camera sensor spectral response characteristics, $Q_G(\lambda)$ is the green camera sensor spectral response characteristics, $Q_B(\lambda)$ is the camera sensor spectral response characteristics, $w_d$ the parameter for the diffuse reflection 820 $\tilde{w}_s$ component, the geometrical parameter for the specular reflection 810 component.

The reflectivity of an object is a measure of the amount of light reflected by an object, or radiance, relative to the amount of incident light shone on the object, or irradiance, and is indicative of the reflectance or intrinsic brightness of an object.

The reflectivity of an object can be used as a signature of the object. Hence it may be used to segment the object with respect to the remainder of an image. The reflectivity of an object is composed of diffuse (Lambertian, body) and specular (surface) components.

The described embodiments deal with diffuse-reflecting materials.

Humans have the ability to separate the illumination power spectral distribution from the surface reflectance function when judging object appearance; such ability is called color constancy.

SUMMARY OF THE INVENTION

In embodiments there is provided a device for processing an image, comprising: processing circuitry configured to receive data of a pixellated current image, data indicative of at least one parameter indicative of the spectral characteristics of the illumination of the scene shown in the current image, and operable to determine the reflectivity of at least one surface of at least one object shown in the current image; modelling circuitry configured to derive a background model from information of at least one previous image of the scene; and decision circuitry configured to compare said reflectivity with a reflectivity of a part of the background model.

In embodiments there is provided a method of processing an image; the method comprising: processing a pixellated current image, using at least one parameter indicative of the spectral characteristics of the illumination of the scene shown in the current image, to determine the reflectivity of at least one surface of at least one object shown in the current image; and comparing said reflectivity with a reflectivity of a part of a background model of the scene shown in the image, the background model being derived from information of at least one previous image of the scene.

The device and method may be applied to foreground object segmentation.

An embodiment includes acquiring an image of a scene including an object of interest, estimating the scene illumination characteristics, calculating values of the reflectivity of the objects in the scene by using the estimated illumination characteristics, and using the reflectivity to segment the object of interest, also referred to herein as a foreground object.

In embodiments, an image representation describes the physical properties of object surfaces, as a step in achieving robust segmentation for foreground objects. A color appearance representation is based on the estimation of illumination spectral characteristics and the knowledge of camera sensor spectral response. An illumination estimation algorithm, a calculation of the physics-based model for image formation (in a described example assuming diffuse-only materials) and transformation from a camera output to the required parameters can be performed in real-time.

In embodiments, segmentation between foreground and background objects is done by matching between the spectral reflectivity of a reference background frame and each new frame over the full spectrum of the visible wavelengths. The technique uses a robust physics-based algorithm for foreground-object segmentation, which performs better than known statistics-based algorithms.

There is disclosed a device for processing an image, comprising: processing circuitry configured to receive data of a pixellated current image, and to determine from that image data at least one parameter indicative of the characteristics of the illuminant; the processing circuitry further configured to process the illuminant data to provide data indicative of at least one parameter indicative of the spectral characteristics of the illumination of the scene shown in the current image, and to process the image data thereby to determine the reflectivity of at least one surface of at least one object shown in the current image; modelling circuitry configured to derive a background model from information of at least one previous image of the scene; and decision circuitry configured to compare said reflectivity with a reflectivity of a part of the background model.

In the device, the processing circuitry may be configured to adaptively separate the spectral characteristics of the illumination from the determined surface reflectivity.

The processing circuitry may be operable to derive the weights of spectral basis functions indicative of illumination or surface reflectivity for pixels in the current image. The weights may be a direct estimate of true parameters of the reflectivity. The decision circuitry may include thresholding circuitry whereby only reflectivity differences greater than a threshold are taken into account. The processing circuitry may be configured to normalize the spectral similarity measure to enable selection of pixels indicative of the illumination spectral characteristics.

Estimating circuitry may estimate the spectral characteristics of the illumination of the scene. The estimating circuitry may be operable to determine highlight regions of an input image, and estimate spectral characteristics of the illuminant of the scene therefrom.

The estimating circuitry may be operable to determine highlight regions of an input image, and estimate the correlated color temperature of the illuminant of the scene The device may further comprise circuitry for determining the spectral characteristics of the illumination using data from the current image and estimating therefrom the spectral characteristics of the illumination. The modelling circuitry may be operable to derive the background model using statistical parameters of surface reflectivity and illuminant characteristics. The modelling circuitry may include update circuitry whereby a change in illuminant triggers an update of model parameters.

The device may further comprise mask-production circuitry operable to use the result of said decision circuitry to create a segmented mask. The device may further comprise a mask processing stage. The mask processing stage may be configured to apply dilation and erosion processes to the segmented mask. A feedback to the modelling circuitry may enable update of the background model using information from the current image.

There is disclosed object segmentation apparatus comprising a device as recited above, and a surveillance system comprising the object segmentation apparatus.

There is also disclosed a method of processing an image; the method comprising:

processing pixellated image data to determine from that image data at least one parameter indicative of the characteristics of the illuminant; processing image data to derive at least one parameter indicative of the spectral characteristics of the illumination of the scene shown in the current image, processing image data to determine the reflectivity of at least one surface of at least one object shown in the current image; and comparing said reflectivity with a reflectivity of a part of a background model of the scene shown in the image, the background model being derived from information of at least one previous image of the scene.

The processing step may comprise deriving the weight of spectral basis functions indicative of surface reflectivity or illumination for pixels in the current image. The comparing step may comprise a threshold comparison.

The method may comprise calculating a ratio between the autocorrelation of the pixels of an image and the autocorrelation of a mean background image.

The method may comprise using the result of said comparing step to create a segmented mask. Dilation and erosion processes may be used. A model maintenance process may enable the background model to be updated using information from the current image.

There is also disclosed an image segmentation method comprising a training phase, and a segmentation phase, wherein the training phase comprises operating on a frame of pixellated data from a camera using information on camera characteristics to render it camera-independent, and processing the camera independent data using a chosen value of illuminant spectral characteristics to derive reflectivity data whereby pixels of high reflectivity are established, using data from the high reflectivity pixels, determining data on the actual illuminant spectral characteristics and processing the illuminant data to determine information on the illumination of the scene represented by the frame of pixellated data to derive reflectivity data of the scene; the segmentation phase comprises operating on a subsequent frame of pixellated data to render it camera-independent and using the determined illumination information to process the camera independent data to determine reflectivity data of the scene to derive a foreground mask.

BRIEF DESCRIPTION OF THE DRAWINGS

An embodiment of the invention will now be described, by way of example only with respect to the accompanying drawings, in which:—

DETAILED DESCRIPTION

In representing the spectral reflectance of objects, the described embodiment that follows uses Parkkinen basis functions by way of example. Other representations may of course be used. For example instead of Parkkinen basis functions, embodiments may use other spectral basis functions, an appropriate set of eigenvectors of the statistical distribution of the spectral reflectances of Munsell color chips, or of natural surfaces, or an appropriately selected set of Fourier basis functions.

Figure 1:
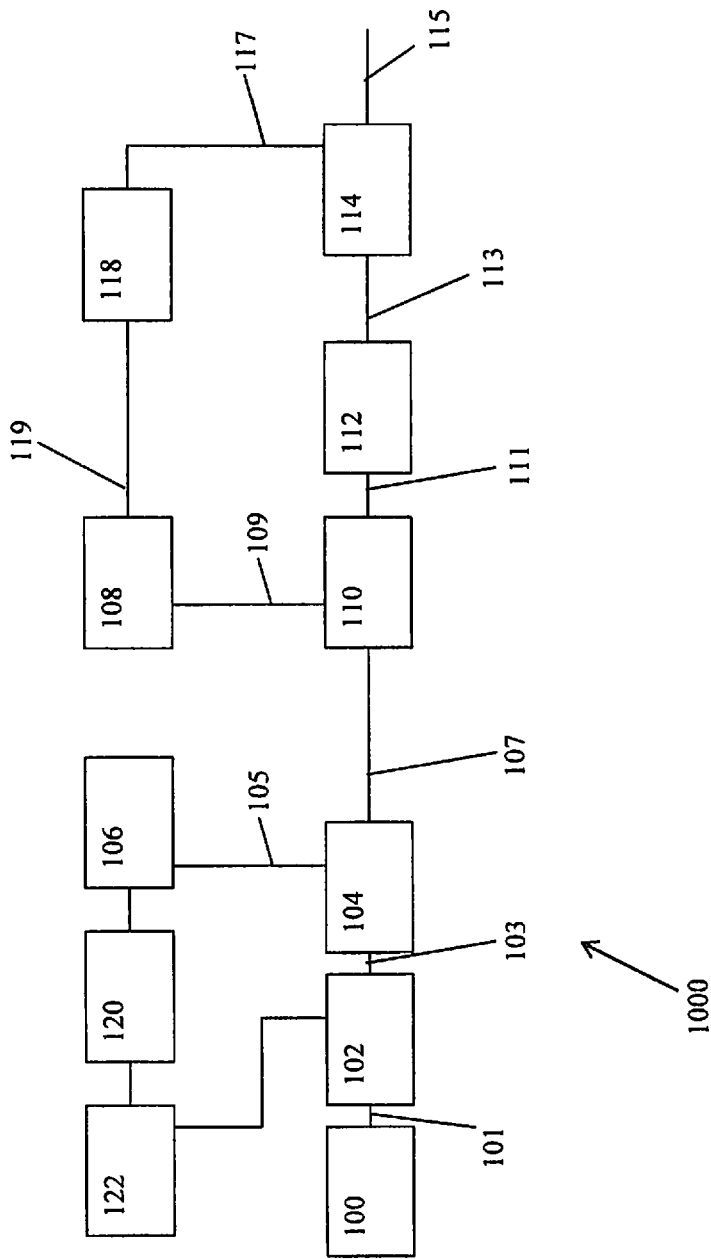
FIG. 1 shows a schematic diagram of an embodiment of an image processing device.

Referring to FIG. 1, an image processing device 1000 for object segmentation of a current image has a camera 100 having an output 101 providing the input to a data converter 102. The data converter 102 has an output 103 to reflectivity processing circuitry 104 also receiving a second input 105 from a first memory 106. The output 107 of the reflectivity processing circuitry 104 provides a first input to decision circuitry 110 that receives a second input 109 from a background modelling circuit 108. The output 111 of the decision circuitry 110 provides the input to mask production circuitry 112. The output 113 of the mask production circuitry 112 is input to a mask processing circuit 114 providing a first output 115 and a second output 117. The first output is provided as the processing output of the device 1000, and the second output 117 provides an input to a feedback and model-update circuit 118, having an output 119 to the background modelling circuit.

Current image information is captured by the camera in pixellated form, and passed to the data converter 102 where the data are converted to RGB output data 103. The RGB output data 103 together with correlated color temperature data 105 indicative of the illumination of the scene depicted in the current image are processed in the reflectivity processing circuitry 104 such that the output 107 is a set of data indicative of the reflectivity of the surfaces of the objects in the scene represented by the pixels of the current image. This output data set 107 is compared with a set of background data 109 indicative of the reflectivity of surfaces of a background image to the scene of the current image. Typically this set of background data is derived by means of a training phase during which no motion occurs, and/or a series of images to take into account newly appearing objects that may become static.

The correlated color temperature data 105 in this embodiment is predetermined, since the embodiment is for a fixed situation, such as an industrial inspection system.

In other embodiments, spectral characteristic data is derived adaptively from input image data by determining the surface reflectivity of objects represented by the image, and separating out the spectral data from the surface reflectivity.

The comparison in this embodiment requires that surface reflectivity represented by a pixel must differ from that represented by a background pixel by more than a particular threshold, rather than merely being greater or less in reflectivity. The output 111 of the decision circuitry 110 is binary and formed into a segmented mask 113 by mask production circuitry 112. The mask 113 in this embodiment is fed to post-processing circuitry 114 that carries out dilation and erosion processes to remove noise in the foreground pixels. Once the filtered foreground pixels are obtained, connected regions are then found by using a connected-component labelling algorithm. The labelled regions may contain near but disjoint regions due to defects in the foreground segmentation process. It has been experimentally found to be effective to merge these overlapping isolated regions. Also, some relatively small regions caused by environmental noise are eliminated in a region-level post-processing step, followed by object and feature extraction stages.

In other embodiments, morphological processes other than, or additional to, dilation and erosion are effected. One output 115 of the post processing circuitry 114 provides the object segmenting mask that is used to segment desired objects from the current image. The other output 117 is processed by the feedback circuitry 118 and passed back to the background modelling circuitry to update the background model.

The decision circuitry 110 operates on a pixel-by-pixel basis and classifies those pixels that are sufficiently different from the statistical model (by more than the threshold) as being representative of a target object, and those that are not as being other objects.

Due to camera noise and illumination variations, a certain number of pixels are likely to be classified as a target object even if they do not belong to it: a high value of the threshold allows maintaining a low number of false detections. On the other hand, objects presenting a low contrast with respect to the target risk to be eliminated if the threshold is excessively high. Accordingly, in some embodiments, a statistical model is used to modify the thresholds in threshold selection process stage.

Figure 2:
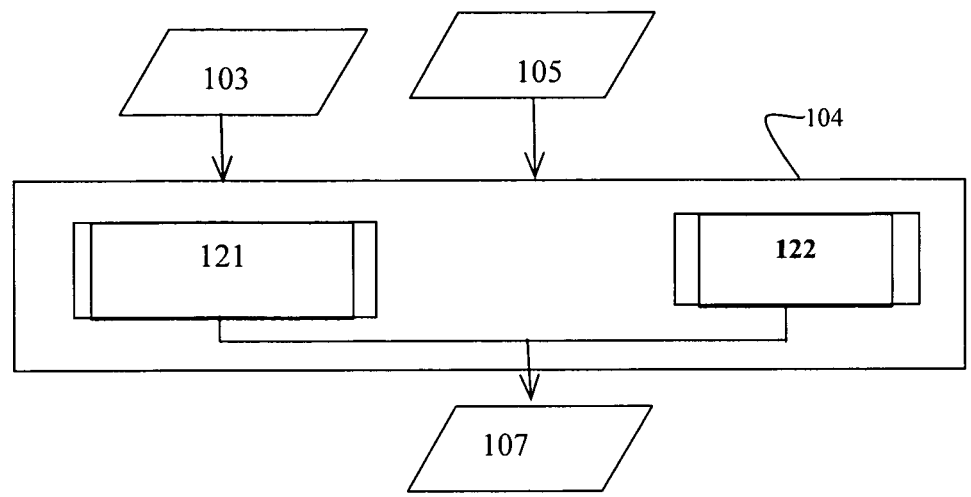
FIG. 2 shows a schematic diagram of reflectivity processing circuitry.

Turning to FIG. 2, reflectivity processing circuitry 104 processes the input image data 103 also using sensor spectral response data 121 of the camera to calculate the weights of Parkkinen basis functions 122 on the basis of a known or calculated illumination color temperature 105, as a direct estimate of the reflectivity characteristics. The output 107 is a set of weight data representing the reflectivity of the surfaces of the objects in the input image in isolation from the effects caused by the camera characteristics and the effects caused by illumination, and changes in illumination.

In order to build a computational physical model, equation 1 is used for the three basis functions of Parkkinen (n=3), so the reflectivity function is represented with $$S(\lambda) \approx \sum_{i=1}^{n} w_i \phi_i(\lambda). \qquad \text{Eq. 2}$$

For example, from the manufacturer's data sheet, the actual characteristics of the sensors of the camera 100 are obtained, as the sensor spectral responses 121.

The aim now is to calculate the weights of Parkkinen basis functions, to obtain the spectral reflectivity of the object represented by the pixels of the current image.

The model is rewritten as:

$$R = w_d w_1 \int E(\lambda) \cdot \phi_1(\lambda) \cdot Q_R(\lambda) d\lambda + w_d w_2 \int E(\lambda) \cdot \phi_2(\lambda) \cdot Q_R(\lambda) d\lambda + w_d w_3 \int E(\lambda) \cdot \phi_3(\lambda) \cdot Q_R(\lambda) d\lambda + \tilde{w}_s \int E(\lambda) Q_R(\lambda) d\lambda$$

$$G = w_d w_1 \int E(\lambda) \cdot \phi_1(\lambda) \cdot Q_G(\lambda) d\lambda + w_d w_2 \int E(\lambda) \cdot \phi_2(\lambda) \cdot Q_G(\lambda) d\lambda + w_d w_3 \int E(\lambda) \cdot \phi_3(\lambda) \cdot Q_G(\lambda) d\lambda + \tilde{w}_s \int E(\lambda) Q_G(\lambda) d\lambda$$

$$B = w_d w_1 \int E(\lambda) \cdot \phi_1(\lambda) \cdot Q_B(\lambda) d\lambda + w_d w_2 \int E(\lambda) \cdot \phi_2(\lambda) \cdot Q_B(\lambda) d\lambda + w_d w_3 \int E(\lambda) \cdot \phi_3(\lambda) \cdot Q_B(\lambda) d\lambda + \tilde{w}_s \int E(\lambda) Q_B(\lambda) d\lambda \qquad \text{Eq. 3}$$

or $$R = \tilde{w}_1 \int E(\lambda) \cdot \phi_1(\lambda) \cdot Q_R(\lambda) d\lambda + \tilde{w}_2 \int E(\lambda) \cdot \phi_2(\lambda) \cdot Q_R(\lambda) d\lambda + \tilde{w}_3 \int E(\lambda) \cdot \phi_3(\lambda) \cdot Q_R(\lambda) d\lambda + \tilde{w}_s \int E(\lambda) Q_R(\lambda) d\lambda$$

$$G = \tilde{w}_1 \int E(\lambda) \cdot \phi_1(\lambda) \cdot Q_G(\lambda) d\lambda + \tilde{w}_2 \int E(\lambda) \cdot \phi_2(\lambda) \cdot Q_G(\lambda) d\lambda + \tilde{w}_3 \int E(\lambda) \cdot \phi_3(\lambda) \cdot Q_G(\lambda) d\lambda + \tilde{w}_s \int E(\lambda) Q_G(\lambda) d\lambda$$

$$B = \tilde{w}_1 \int E(\lambda) \cdot \phi_1(\lambda) \cdot Q_B(\lambda) d\lambda + \tilde{w}_2 \int E(\lambda) \cdot \phi_2(\lambda) \cdot Q_B(\lambda) d\lambda + \tilde{w}_3 \int E(\lambda) \cdot \phi_3(\lambda) \cdot Q_B(\lambda) d\lambda + \tilde{w}_s \int E(\lambda) Q_B(\lambda) d\lambda \qquad \text{Eq. 4}$$

where $$\tilde{w}_1 = w_d w_1, \tilde{w}_2 = w_d w_2 \text{ and } \tilde{w}_3 = w_d w_3 \qquad \text{Eq. 5}$$

Knowing that the first basis function of Parkkinen is constant, so $\phi_1(\lambda) = k_\phi$, so $$R = \tilde{w}_1 \cdot k_\phi \int E(\lambda) \cdot Q_R(\lambda) d\lambda + \tilde{w}_2 \int E(\lambda) \cdot \phi_2(\lambda) \cdot Q_R(\lambda) d\lambda + \tilde{w}_3 \int E(\lambda) \cdot \phi_3(\lambda) \cdot Q_R(\lambda) d\lambda + \tilde{w}_s \int E(\lambda) Q_R(\lambda) d\lambda$$

$$G = \tilde{w}_1 \cdot k_\phi \int E(\lambda) \cdot Q_G(\lambda) d\lambda + \tilde{w}_2 \int E(\lambda) \cdot \phi_2(\lambda) \cdot Q_G(\lambda) d\lambda + \tilde{w}_3 \int E(\lambda) \cdot \phi_3(\lambda) \cdot Q_G(\lambda) d\lambda + \tilde{w}_s \int E(\lambda) Q_G(\lambda) d\lambda$$

$$B = \tilde{w}_1 \cdot k_\phi \int E(\lambda) \cdot Q_B(\lambda) d\lambda + \tilde{w}_2 \int E(\lambda) \cdot \phi_2(\lambda) \cdot Q_B(\lambda) d\lambda + \tilde{w}_3 \int E(\lambda) \cdot \phi_3(\lambda) \cdot Q_B(\lambda) d\lambda + \tilde{w}_s \int E(\lambda) Q_B(\lambda) d\lambda \qquad \text{Eq. 6}$$

which then could be merged with the specular component to give:

$$R = \tilde{w}_1 \cdot k_\phi + \tilde{w}_s \int E(\lambda) \cdot Q_R(\lambda) d\lambda + \tilde{w}_2 \int E(\lambda) \cdot \phi_2(\lambda) \cdot Q_R(\lambda) d\lambda + \tilde{w}_3 \int E(\lambda) \cdot \phi_3(\lambda) \cdot Q_R(\lambda)$$

$$G = \tilde{w}_1 \cdot k_\phi + \tilde{w}_s \int E(\lambda) \cdot Q_G(\lambda) d\lambda + \tilde{w}_2 \int E(\lambda) \cdot \phi_2(\lambda) \cdot Q_G(\lambda) d\lambda + \tilde{w}_3 \int E(\lambda) \cdot \phi_3(\lambda) \cdot Q_G(\lambda) d\lambda$$

$$B = \tilde{w}_1 \cdot k_\phi + \tilde{w}_s \int E(\lambda) \cdot Q_B(\lambda) d\lambda + \tilde{w}_2 \int E(\lambda) \cdot \phi_2(\lambda) \cdot Q_B(\lambda) d\lambda + \tilde{w}_3 \int E(\lambda) \cdot \phi_3(\lambda) \cdot Q_B(\lambda) d\lambda \qquad \text{Eq. 7}$$

by taking $$X_i = \int E(\lambda) \cdot \phi_i(\lambda) \cdot Q_R(\lambda) d\lambda$$

$$Y_i = \int E(\lambda) \cdot \phi_i(\lambda) \cdot Q_R(\lambda) d\lambda$$

$$Z_i = \int E(\lambda) \cdot \phi_i(\lambda) \cdot Q_R(\lambda) d\lambda \qquad \text{Eq. 8}$$

These integrations are calculated to obtain the transformation matrix $$\begin{bmatrix} R \\ G \\ B \end{bmatrix} = \begin{bmatrix} X_1 & X_2 & X_3 \\ Y_1 & Y_2 & Y_3 \\ Z_1 & Z_2 & Z_3 \end{bmatrix} \begin{bmatrix} \tilde{w}_1 \cdot k_\phi + \tilde{w}_s \\ \tilde{w}_2 \\ \tilde{w}_3 \end{bmatrix}. \qquad \text{Eq. 9}$$

Now the weights of the basis functions can be obtained from RGB values by:

$$\begin{bmatrix} \tilde{w}_1 \cdot k_\phi + \tilde{w}_s \\ \tilde{w}_2 \\ \tilde{w}_3 \end{bmatrix} = \begin{bmatrix} X_1 & X_2 & X_3 \\ Y_1 & Y_2 & Y_3 \\ Z_1 & Z_2 & Z_3 \end{bmatrix}^{-1} \begin{bmatrix} R \\ G \\ B \end{bmatrix} \qquad \text{Eq. 10}$$

or $$\begin{bmatrix} w_d \cdot w_1 \cdot k_\phi + w_s \cdot k_s \\ w_d \cdot w_2 \\ w_d \cdot w_3 \end{bmatrix} = \begin{bmatrix} X_1 & X_2 & X_3 \\ Y_1 & Y_2 & Y_3 \\ Z_1 & Z_2 & Z_3 \end{bmatrix}^{-1} \begin{bmatrix} R \\ G \\ B \end{bmatrix}. \quad \text{Eq. 11}$$

As a special case for diffuse-only reflection $w_s=0$ then:

$$\begin{bmatrix} \tilde{w}_1 \\ \tilde{w}_2 \\ \tilde{w}_3 \end{bmatrix} = \begin{bmatrix} X_1 & X_2 & X_3 \\ Y_1 & Y_2 & Y_3 \\ Z_1 & Z_2 & Z_3 \end{bmatrix}^{-1} \begin{bmatrix} R \\ G \\ B \end{bmatrix} \quad \text{Eq. 12}$$

where $\tilde{w}_1 = w_d \cdot w_1 \cdot k_\phi$, $\tilde{w}_2 = w_d \cdot w_2$ and $\tilde{w}_3 = w_d \cdot w_3$.

By using this transformation, the RGB image is represented by basis function weights as an expression of the reflectivity of the surfaces represented in the current image.

Figure 3:
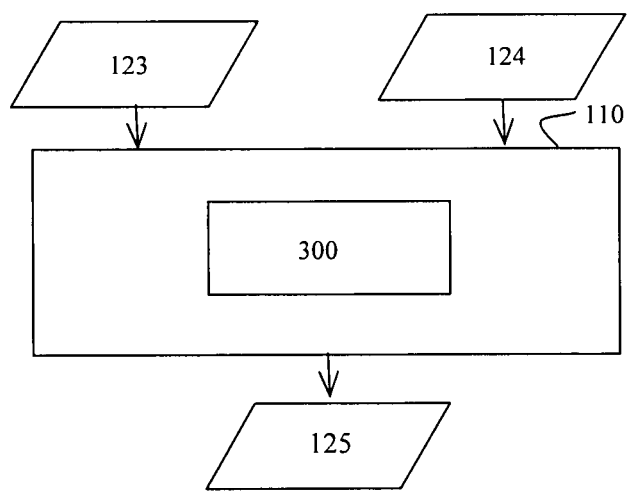
FIG. 3 shows a schematic diagram of comparison circuitry.

Turning now to FIG. 3, given their illumination parameters, to compare two objects (whether they have the same surface material and color or not), their spectral reflectivity functions 123, 124 can be compared by cross-correlation.

This may be achieved by the correlation between the Parkkinen basis functions in a statistical computing module 300 of the decision circuitry 110.

$$\begin{bmatrix} K_{11} \\ K_{22} \\ K_{33} \\ K_{12} \\ K_{13} \\ K_{23} \end{bmatrix} = \begin{bmatrix} \text{Corr}(\phi_1, \phi_1) \\ \text{Corr}(\phi_2, \phi_2) \\ \text{Corr}(\phi_3, \phi_3) \\ \text{Corr}(\phi_1, \phi_2) \\ \text{Corr}(\phi_1, \phi_3) \\ \text{Corr}(\phi_2, \phi_3) \end{bmatrix} \quad \text{Eq. 13}$$

If the first surface has weights 123 given by $\tilde{w}_1$, $\tilde{w}_2$ and $\tilde{w}_3$, while the second surface has weights 124 given by $\tilde{w}'_1$, $\tilde{w}'_2$ and $\tilde{w}'_3$, then the correlation 125, indicating the degree of similarity between two different surfaces becomes:

$$\text{Corr}(I_1, I_2) = \tilde{w}_1 \tilde{w}'_1 K_{11} + \tilde{w}_2 \tilde{w}'_{21} K_{22} + \tilde{w}_3 \tilde{w}'_3 K_{33} + \quad \text{Eq. 14}$$
$$(\tilde{w}_1 \tilde{w}'_2 + \tilde{w}_2 \tilde{w}'_1) K_{12} + (\tilde{w}_1 \tilde{w}'_3 + \tilde{w}_3 \tilde{w}'_1) K_{13} + (\tilde{w}_2 \tilde{w}'_3 + \tilde{w}_3 \tilde{w}'_2) K_{23}$$

Figure 4A:
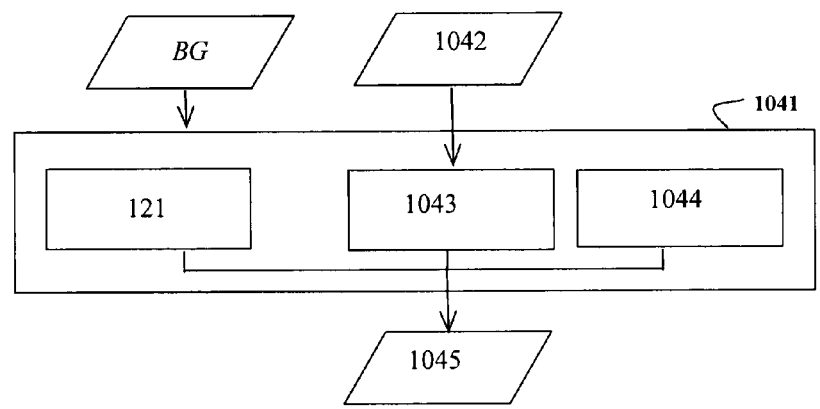
FIG. 4 shows a schematic diagram of an illumination estimation stage.

Referring now to FIG. 4a, an illumination estimation algorithm starts by segmenting areas in the image which represent high specularities (highlights) 701. To do this a modified version 1041 of the illumination estimation stage 104 is supplied with one background frame BG, and the data from this is processed using camera spectral response data 121. At present, there is likely to be no calculated value of illuminant, so a value 1042 for the illuminant correlation color temperature (CCT) is chosen depending on the available knowledge of the environment. In the embodiment, initially the color temperature is set at T=4400° K for Fluorescent F2.

The illumination spectral characteristic is then calculated in processing step 1043 using Planck's formula:

$$E(\lambda) = c_1 \cdot \lambda^{-5} \cdot \left(e^{\frac{c_2}{\lambda T}} - 1\right)^{-1} \cong c_1 \cdot \lambda^{-5} \cdot e^{\frac{-c_2}{\lambda T}} \quad \text{Eq. 15}$$

where $E(\lambda)$ is the illumination spectral power distribution in Watts/m²/wavelength interval; $\lambda$ is the wavelength in m; $c_1=3.74183 \cdot 10^{-16}$ Watt·m²; $c_2=1.4388 \cdot 10^{-2}$ m·° K; T is the color temperature of the illuminant, in ° K.

Finally the reflectivity 1045 (per pixel) is calculated in step 1044 using the processes set out above with respect to FIG. 2.

Figure 4B:
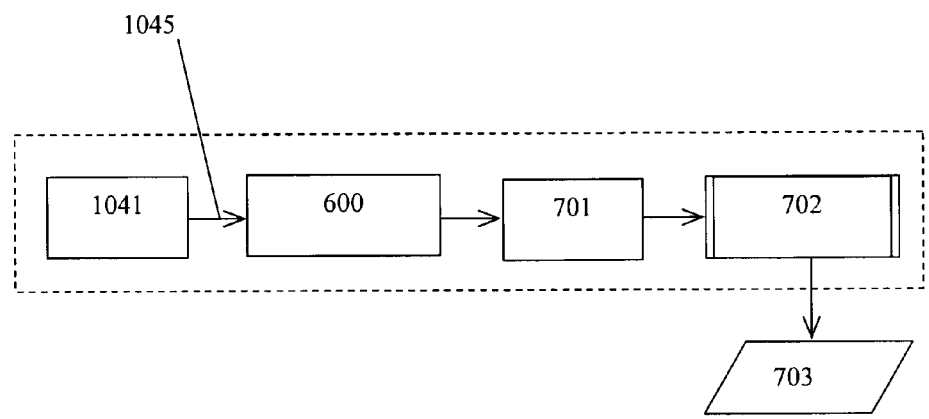

Turning to FIG. 4b, in order to segment the areas with high specularities (Highlight$_{Mask}$) 701, the reflectivity value 1045 is then subject to autocorrelation in a statistical computing module 600 for all pixels of the current frame. The autocorrelation outcome is thresholded, in this embodiment using a threshold value of 0.5, to provide a set of pixels of high specularity, as follows:

$$Highlight_{mask} = \begin{cases} 0 & \text{Corr}(BG, BG) < 0.5, \\ 1 & \text{otherwise} \end{cases} \quad \text{Eq. 16}$$

In other embodiments and for other data sets different values of threshold may be appropriate.

The segmented pixels with high specularities 701 are converted to CIE xyz and used to calculate the actual correlated color temperature 703 of the illuminant, using a process 702 based upon McCamy's method, according to the following two equations:

$$n = \frac{x - x_e}{y_e - y} \quad \text{Eq. 17}$$

where $x_e=0.3320$ and $y_e=0.1858$ $$CCT = 449 \cdot n^3 + 3525 \cdot n^2 + 6823.3 \cdot n + 5520.33 \quad \text{Eq. 18}$$

The value of CCT 703 of the illuminant may now be applied to the memory 106 for use by the reflectivity processing circuitry 104 (see FIG. 1) in handling later image data. McCamy's method, used in this embodiment, is able to estimate the CCT from CIE 1931 chromaticity coordinates x and y. McCamy's method has a maximum absolute error of less than 2° K for color temperatures ranging from 2,856 to 6,500° K (corresponding to CIE illuminants A through D65). These errors are negligible over the range of interest in this patent application. This method proves useful for implementation in real-time applications. It was derived from the assumption that CCT may be represented by a third-order polynomial function of the reciprocal of the slope of the line from specular pixels to the chromaticity of the light and the fact that the isotemperature lines for CCTs of principal interest nearly converge towards a point on the chromaticity diagram.

Figure 5:
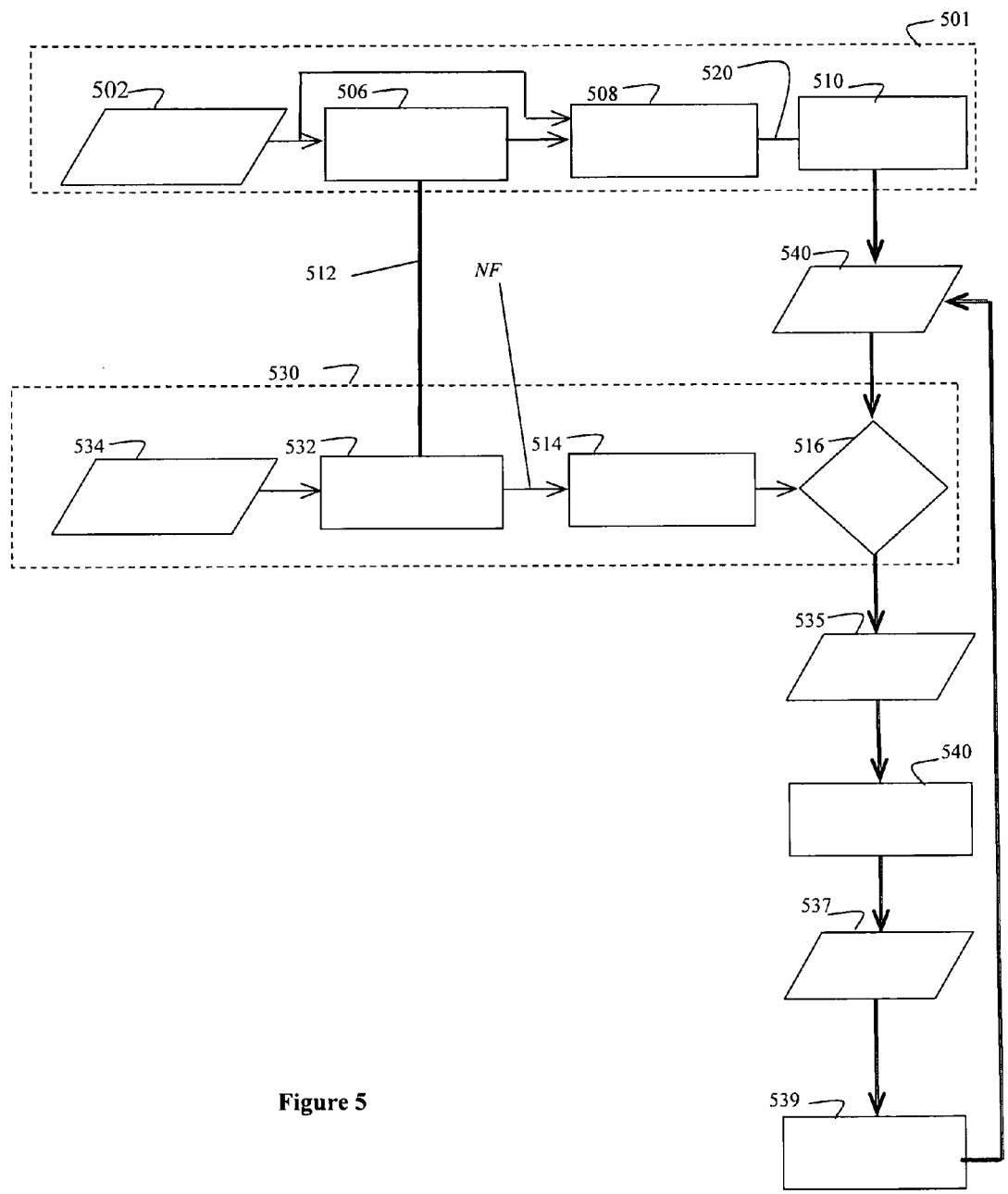
FIG. 5 shows an exemplary algorithm for segmenting an object.
Figure 6:
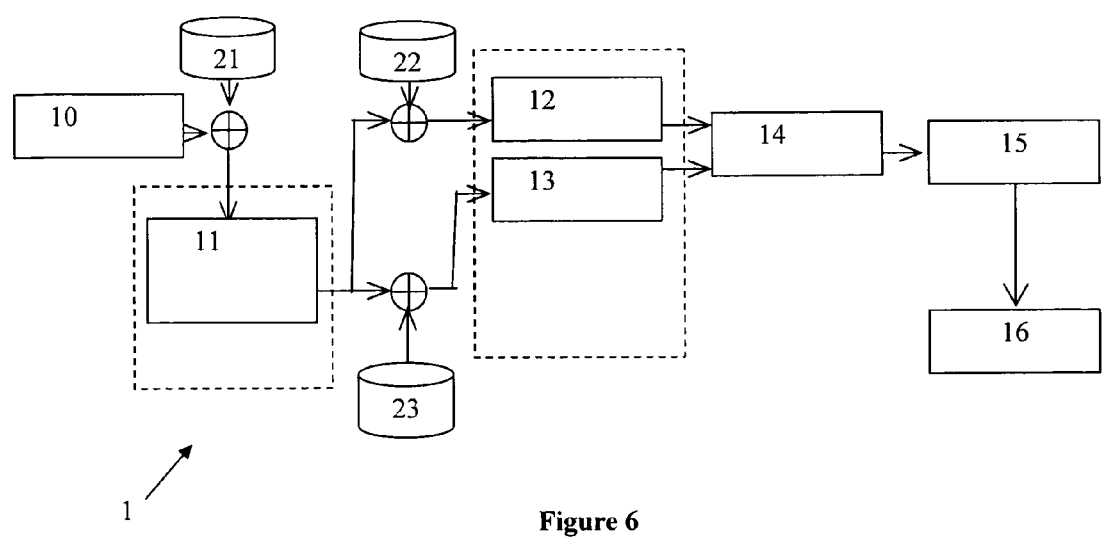
FIG. 6 shows a block diagram of an automated video surveillance system.
Figure 7:
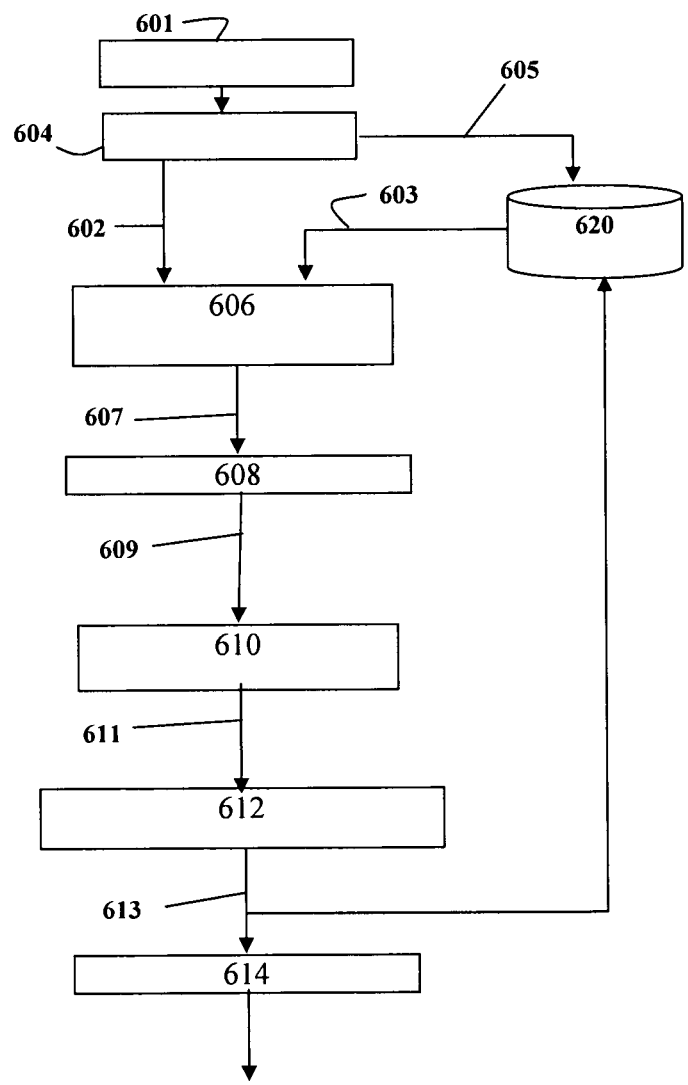
FIG. 7 shows a known algorithm for object segmentation.
Figure 8:
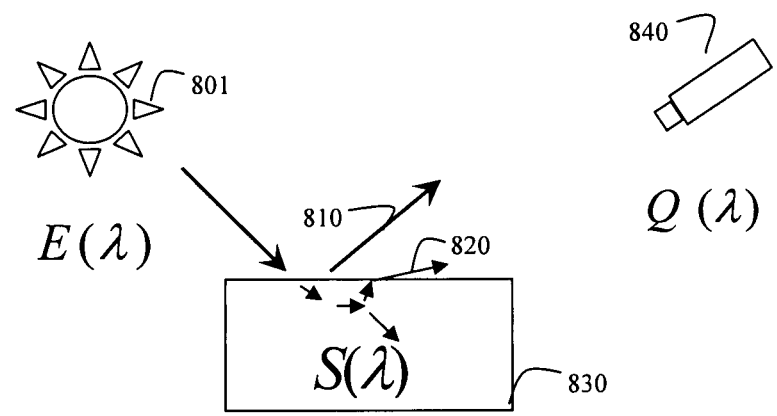
FIG. 8 is a diagram showing how illumination and the image picked up by a camera are related.

Turning to FIG. 5, the algorithm starts with a training phase 501 where training images 502 are acquired using an image acquisition stage, here including a full color video camera, to produce a composite video output stream at a conventional frame rate.

The image acquisition stage may include a variety of types of video cameras and in general, any suitable mechanism for capturing an image of a subject may be used as the image acquisition stage. The image acquisition stage may, alternatively, be an interface to a storage device, such as a magnetic storage medium or other components for storing videos or image data. The stored videos include compressed and uncompressed formats.

As used herein, "image data" refers to data which define or characterize an image including color spaces such as RGB, YCbCr, YUV, and CIE XYZ, etc. . . . , as well as other associated data, such as luminance values and chrominance values.

The video output stream is received by a frame grabber, which serves to latch frames of the composite video input stream and to convert the composite video analogue signal into a digitised output signal, which is then processed by the remainder of the system. Typical conventional video cameras produce an analog video output stream of 30 frames per second, and thus the image acquisition is configured to capture and digitize image frames as this video rate. The video camera need not be limited to composite-video, analog output, or 30 frames per second; the video camera could output digital video, at frame rates other that 30 frames per second.

The image acquisition produces a digitised frame output signal. The camera itself can digitize acquired images, and hence the frame grabber stage can be integrated directly into the camera.

In order to start the background modelling phase, this embodiment acquires a sequence of N input images 502 which represent relatively static background frames. These frames are then converted into reflectivity weights 520 in a reflectivity calculation step 508 that is based upon an illumination estimation step 506 providing a calculated CCT. Then the mean reflectivity of the background training images is calculated in a manipulation step 510 as a reference reflectivity $$BG_{mean},$$

$$BG_{mean} = \text{mean}(BG) \qquad \text{Eq. 19}$$

Next, in the manipulation step 510 the autocorrelation is calculated, without normalization of its magnitude, as $$BG_{Corr} = \text{Corr}(BG_{mean}, BG_{mean}). \qquad \text{Eq. 20}$$

In the described embodiment, the reflectivity correlation is calculated using Eq. 14.

Then the manipulation step 510 passes through all background training frames $BG_i$ and calculates the ratio $C_{BG}$ between the autocorrelation of the reflectivity of each frame and the autocorrelation of the mean background reflectivity of background frames, $BG_{mean}$, $$C_{BG} = \frac{\text{Corr}(BG_{mean}, BG_{mean})}{\text{Corr}(BG_i, BG_i)} \qquad \text{Eq. 21}$$

where i represents the background frame number from 1→N, where N is the number of background frames used to estimate the reflectivity of the background.

Finally, the manipulation step calculates the maximum $C_{max}$ and minimum $C_{min}$ of $C_{BG}$ as a statistical model of the background, $$C_{min} = \min(C_{BG})$$

$$C_{max} = \max(C_{BG}). \qquad \text{Eq. 22}$$

To perform object segmentation, after building the statistical model of the background 540, the segmentation phase 530 starts by capturing a new frame 534, and then the reflectivity calculation module 532 converts the new frame to basis function weights representing its reflectivity NF, using the illumination parameter 512 calculated in the illumination calculation stage 506 of the training phase. Then a statistical computing module 514 calculates the autocorrelation $NF_{Corr}$ of the reflectivity of the new frame as $$NF_{Corr} = \text{Corr}(NF, NF). \qquad \text{Eq. 23}$$

Then the ratio C between the correlation of the reflectivity of the new frame and the autocorrelation of the mean reflectivity of the background frames $BG_{mean}$, is calculated as $$C = \frac{BG_{Corr}}{NF_{Corr}}.$$

In a change detection stage 516, a threshold creates an initial binary foreground mask 535 defined as $FG_{Mask}$, using the maximum $C_{max}$ and minimum $C_{min}$ values of correlation ration $C_{BG}$ measured from the pool of background frames.

$$FG_{Mask} = \begin{cases} 0 & \tau_{min}C_{min} < C < \tau_{max}C_{max}, \\ 1 & \text{otherwise} \end{cases} \qquad \text{Eq. 24}$$

The thresholds used here in this described embodiment are $\tau_{max}=1.2$ and $\tau_{min}=0.8$, other datasets may require other thresholds.

In other embodiments, the ratio of reflectivity autocorrelation used in this embodiment to detect the foreground mask can be replaced by at least one measure indicative of the reflectivity change of object surface. For example, the cross-correlation between the mean reflectivity of background frames $BG_{mean}$ and the reflectivity parameter of each background frame can be calculated in the background modelling phase as $\text{Corr}(BG_{mean}, BG_i)$ and Eq. 22 applied to find the bounds $C_{max}$ and $C_{min}$ of this parameter. In the object segmentation phase, the cross-correlation between the mean reflectivity of background frames $BG_{mean}$ and the reflectivity of each new frame NF can be calculated as $\text{Corr}(BG_{mean}, NF)$ and used as C in Eq. 24 to detect pixels which are significantly different from the background.

After the initial foreground mask 535 has been created from the new frame by the change detection stage 516, a post-processing step 540 applies a dilation step which performs a dilation operation thereon to expand or thicken the initial foreground mask 535. The dilation operation is the union of all translations of the mask 535 by the structuring element SE.

Then an erosion step performs an erosion operation on the resultant mask, which reduces the size of an object by eliminating area around the object edges. After the erosion operation has been completed; the detection stage performs a connected component blob analysis on the mask 535. The erosion operation removes noise and eliminates foreground mask details smaller than the structuring element SE, where the size of the structuring element for both dilation and erosion, in this embodiment, is:

$$SE = 2 \text{ pixels}. \qquad \text{Eq. 25}$$

There are many conventional techniques which can be used in place of dilation followed by erosion.

The result is a final foreground mask 537.

The scene background model 540 is derived by observing the scene during a training period; this model may be updated continuously, especially where change of illumination occurs, or where objects may enter the scene and remain static for substantial time periods. The embodiments update the background model 540 through a model maintenance phase 539, using an update rate α, according to the following formulas:

$$BG_{mean}(FG_{Mask}) = (1-\alpha) \cdot BG_{mean}(FG_{Mask}) + \alpha \cdot NF(FG_{Mask}) \qquad \text{Eq 26}$$

$$C_{max}(C_{Mask}{}^{max})=(1-\alpha)\cdot C_{max}(C_{Mask}{}^{max})+\alpha\cdot NF(C_{Mask}{}^{max})$$ Eq. 17

$$C_{min}(C_{Mask}{}^{min})=(1-\alpha)\cdot C_{min}(C_{Mask}{}^{min})+\alpha\cdot NF(C_{Mask}{}^{min})$$ Eq. 28 where $$C_{Mask}{}^{max}=C>\tau_{max}C_{max},$$

$$C_{Mask}{}^{max}=C\geq\tau_{min}C_{min},$$ Eq. 29

The value of the update rate α used for the background model in this embodiment is α=0.001, although other datasets may require other values.

The modelling circuitry may include update circuitry operable to rapidly update if a rapid change in illuminant occurs, for example if a shadow moves across part or the entire image, or if an illuminating light source turns off.

The mask output 537 shows very good segmentation results for foreground pixels, the selection of thresholds is easy. The use of the full spectrum of the intrinsic spectral reflectivity is effective in order to differentiate between foreground and background objects.

The algorithm can work in real-time and each frame is executed in average 0.178 seconds using a Xeon personal computer, (processor: Intel Xeon 3 GHz, memory: 2 GB DDR RAM), an implementation in Matlab (version: 7.4, release: R2007a).

An implementation uses the value of correlation as the metric of the similarity between the pixels in the new frame with corresponding pixels in the background.

In the described embodiment account is made only of diffuse reflections, and it is assumed that illumination characteristics follow Planck's formula in estimating color temperature. However the method of the invention is more generally applicable, with the same or a similar algorithm being useable for both diffuse and specular reflections, and the use of other techniques to estimate the illumination.

The invention is not limited to the described features of the embodiments, and extends to the full scope of the appended claims.

The invention claimed is:

1. A device for processing an image, comprising:
processing circuitry configured to receive image data of a pixellated current image, and to determine from that image data at least one parameter indicative of the characteristics of an illuminant, wherein the illuminant is the source (or sources) of light of the image;
the processing circuitry further configured to process the at least one parameter indicative of the characteristics of the illuminant to derive illumination data indicative of the spectral characteristics of the illumination of the scene shown in the current image, and to process the image data using the derived illumination data thereby to determine the spectral reflectivity of at least one surface of at least one object shown in the current image by deriving at least one parameter representative of said spectral reflectivity;
modelling circuitry configured to derive a background model from information of at least one previous image of the scene; and
decision circuitry configured to compare, over a wide spectral band said spectral reflectivity with a spectral reflectivity of a part of the background model, the comparing performed by computing a similarity measure by combining the at least one parameter representative of said spectral reflectivity with at least one parameter indicative of a similarity between spectral basis functions.

2. A device according to claim 1, wherein the processing circuitry is configured to adaptively separate the spectral characteristics of the illumination from the determined surface spectral reflectivity.

3. A device according to claim 1, wherein the at least one parameter representative of said spectral reflectivity comprises a weight associated with one of the spectral basis functions.

4. A device according to claim 1, wherein the decision circuitry includes thresholding circuitry whereby only reflectivity differences greater than a threshold are taken into account.

5. A device according to claim 1, wherein the processing circuitry is configured to normalize a spectral similarity measure to enable selection of pixels indicative of the illumination spectral characteristics.

6. A device according to claim 1, further comprising estimating circuitry for estimating the spectral characteristics of the illumination of the scene.

7. A device according to claim 6, wherein the estimating circuitry is operable to determine highlight regions of an input image, and estimate spectral characteristics of the illuminant of the scene therefrom.

8. A device according to claim 6, wherein the estimating circuitry is operable to determine highlight regions of an input image, and estimate the correlated color temperature of the illuminant of the scene.

9. A device according to claim 1, further comprising circuitry for determining the spectral characteristics of the illumination using data from the current image and estimating therefrom the spectral characteristics of the illumination.

10. A device according to claim 1, wherein the modelling circuitry is operable to derive the background model using statistical parameters of surface spectral reflectivity and illuminant characteristics.

11. A device according to claim 1, wherein the modelling circuitry includes update circuitry whereby a change in illuminant triggers an update of model parameters.

12. A device according to claim 1, further comprising mask-production circuitry operable to use the result of said decision circuitry to create a segmented mask.

13. A device according to claim 12, further comprising a mask processing stage.

14. A device according to claim 13, wherein the mask processing stage is configured to apply dilation and erosion processes to the segmented mask.

15. A device according to claim 1, further comprising a feedback to the modelling circuitry, whereby the background model is updated using information from the current image.

16. Object segmentation apparatus comprising a device according to claim 1.

17. A surveillance system comprising the object segmentation apparatus of claim 16.

18. A method of processing an image; the method comprising:
processing image data of a pixellated current image to determine from that image data at least one parameter indicative of the characteristics of an illuminant, wherein the illuminant is the source (or sources) of light of the image;
deriving illumination data using the image data, the illumination data indicative of the spectral characteristics of the illumination of a scene shown in the current image;
processing image data using the derived illumination data to determine a spectral reflectivity of at least one surface of at least one object shown in the current image, wherein processing the image data using the derived illumination data comprises deriving at least one parameter representative of said spectral reflectivity; and comparing, over a wide spectral band, said spectral reflectivity of the at least one surface of the at least one object shown in the current image with a spectral reflectivity of a part of a background model of the scene shown in the current image, the background model being derived from information of at least one previous image of the scene, wherein comparing comprises computing a similarity measure by combining the at least one parameter representative of said spectral reflectivity with at least one parameter indicative of a similarity between spectral basis functions.

19. A method according to claim 18, wherein the at least one parameter representative of said spectral reflectivity comprises a weight associated with one of the spectral basis functions.

20. A method according to claim 18, wherein the comparing step comprises a threshold comparison.

21. A method according to claim 18, comprising calculating a ratio between the autocorrelation of the pixels of an image and the autocorrelation of a mean background image.

22. A method according to claim 18, comprising using the result of said comparing step to create a segmented mask.

23. A method according to claim 22, further comprising a mask processing stage.

24. A method according to claim 23, wherein the mask processing stage comprises dilation and erosion processes.

25. A method according to claim 18, further comprising a model maintenance process, whereby the background model is updated using information from the current image.

26. An image segmentation method comprising a training phase, and a segmentation phase, wherein the training phase comprises operating on a frame of pixellated data from a camera using information on camera characteristics to render the pixellated data camera-independent, and processing the camera independent data using a chosen value of illuminant spectral characteristics to derive spectral reflectivity data whereby pixels of high reflectivity are established, using data from the high reflectivity pixels, determining data on the actual illuminant spectral characteristics and processing the illuminant data to determine information on the illumination of the scene represented by the frame of pixellated data to derive spectral reflectivity data of the scene;

wherein processing the camera independent data comprises deriving at least one parameter representative of spectral reflectivity;

wherein the segmentation phase comprises operating on a subsequent frame of pixellated data to render it camera-independent and using determined information on the illumination of the scene to process the camera independent data to determine spectral reflectivity data of the scene to derive a foreground mask; and comparing, over a wide spectral band, a spectral reflectivity of at least one surface of at least one object shown in the subsequent frame with a spectral reflectivity of a part of a background model of the scene shown in the subsequent frame, the background model being derived from information of at least one previous image of the scene, wherein comparing comprises computing a similarity measure by combining the at least one parameter representative of spectral reflectivity with at least one parameter indicative of a similarity between spectral basis functions.

* * * * *